Feb. 26, 1957 G. B. HOWELL 2,782,680
PROJECTION READER
Filed Aug. 16, 1951 3 Sheets-Sheet 1

INVENTOR
GEORGE B. HOWELL,

BY Ralph B. Stewart
ATTORNEY

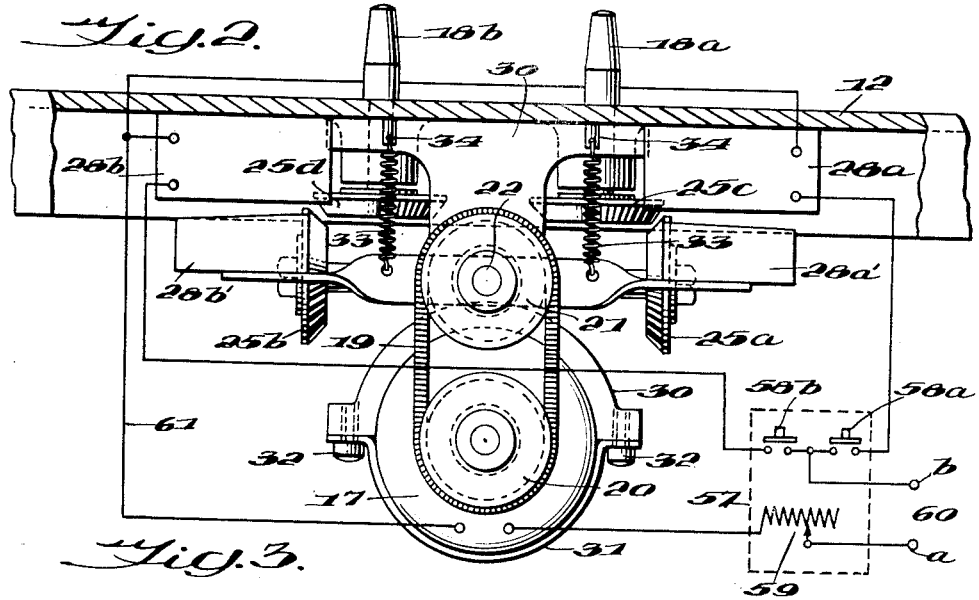

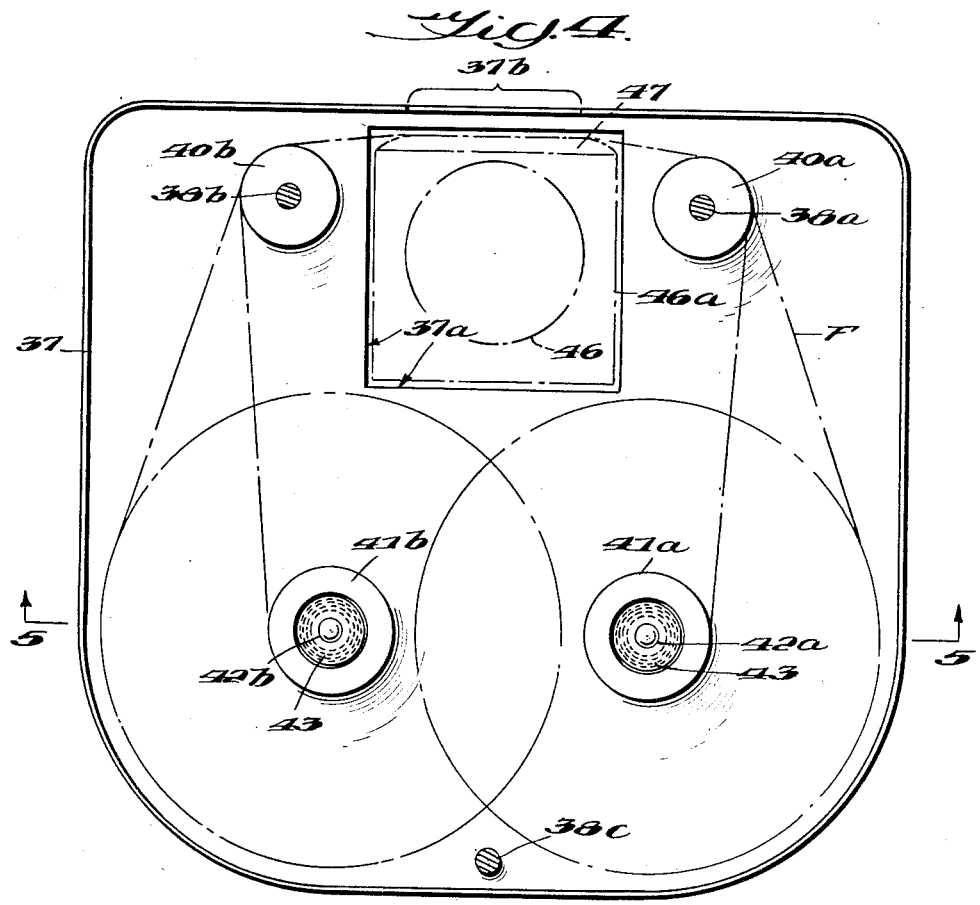
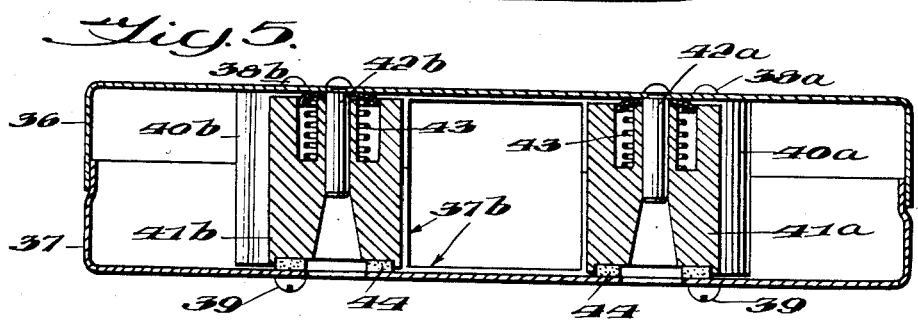

United States Patent Office 2,782,680
Patented Feb. 26, 1957

2,782,680

PROJECTION READER

George Blaine Howell, Tampa, Fla., assignor, by mesne assignments, to Empire Steel Products Corporation, a corporation of Florida Application August 16, 1951, Serial No. 242,126

5 Claims. (Cl. 88—24)

This invention relates to projection devices of the type for presenting reading matter, statistical data and the like, in readily legible form, by enlarged projection from a film.

One object of the invention is to devise a projection reader which is self contained and which gives a large magnification within a relatively small bulk.

A further object is to provide a reader to selectively present parallel columns or pages extending longitudinally on the film strips.

Another object is to provide a reader adapted to use a film without sprocket perforations and to utilize the entire width of the film for projection.

Another object is to provide a revolvable projection head which will allow presentation of the image on the screen in an upright position regardless of its position on the film, whether it be parallel or perpendicular to the length of the film.

A further object is to devise a reader which requires no skill to insert and remove the film. Each film is permanently housed in an individual casing or magazine which supports the film during projection and forms a protective casing for storage of the film. Each magazine includes two film spools and a pair of guide rolls. Each spool is provided with a socket for receiving a driving spindle to move or roll the film within the magazine between the projection lens and the light source from one spool to another spool and vice versa. The film remains threaded on the guide rolls, within the magazine, thus eliminating the necessity of threading the film each time a film is changed as is required on conventional readers. In other words, the whole magazine containing two spools and the film is placed on the projection head as a unit instead of the two spools and film as is required on conventional readers.

A further object is to devise improved film driving means using an electric motor of variable speed, including forward and reverse drive by push button control.

A still further feature is the provision of motive control means on a board or panel, detached from the main body of the reader except for an electrical cable, whereby the control may be placed on a work table or desk at the operator's convenience.

Other objects and advantages will appear from the following description in connection with the attached drawings, in which:

Figure 2 is a view of Figure 1 taken along the line 2—2 and showing the film driving arrangement in front elevation;

Figure 3 is a top plan view of Figure 2 with a part of the turntable of the projection head broken away to show the film driving arrangement;

Figure 4 is a plan view of a film magazine with the cover removed; and

Figure 5 is a sectional view of Figure 4 taken along the line 5—5, illustrating the magazine in vertical section and with the cover applied thereto.

Figure 1:
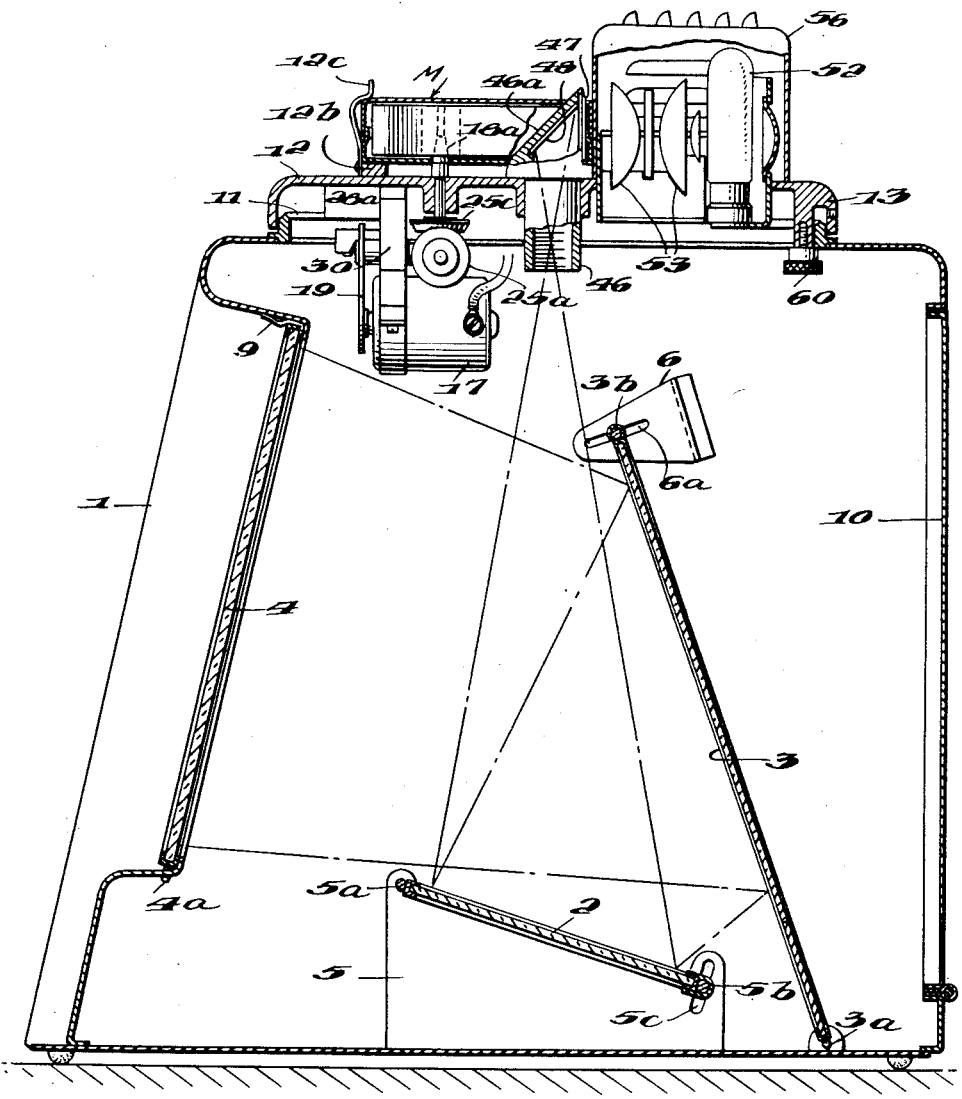
Figure 1 is a sectional view of the assembled reader taken along a vertical plane passing through the center of the projection head from front to rear, certain parts of the reader being shown in elevation.

The reader includes a cabinet 1 which houses mirrors 2 and 3 for the purpose of reflecting a projected image from the projection head mounted on top of the cabinet, onto a translucent screen 4 mounted in an opening in the front wall of the cabinet, thus presenting on the screen an image visible from without the cabinet.

Mirror 2 is mounted in the lower part of the cabinet 1 by means of a pair of brackets 5 supported on the bottom wall of the cabinet. The front edge of the mirror is supported on a horizontal pivotal axis by means of a rod 5a supported on brackets 5, and the rear edge of the mirror is adjustably supported by a rod 5b the ends of which pass through slots 5c formed in brackets 5. Mirror 3 is mounted to the rear of mirror 2 and the lower edge of this mirror is pivotally supported on a horizontal axis by a rod 3a extending through a pair of supporting brackets mounted on the bottom wall of the casing. The upper edge of the mirror 3 is adjustably supported for movement about the axis 3a by means of a rod 3b the ends of which pass through slots 6a of the mounting brackets 6 secured to the side walls of the cabinet. Rods 3b and 5b are provided with suitable clamping nuts, not shown, threaded on their ends. These adjustable features of the reflecting mirrors provided for corrections to deviations in projecting.

The translucent screen 4 is removably held in place in the opening in the front wall of the cabinet by means of pins 4a on the lower edge of the mirror extending through holes formed in a horizontal wall portion and by spring clips 9 carried by the casing and engaging the upper edge of the mirror. Thus mirror 2 is readily removable for access to the inside of the cabinet. A door 10 hinged at its lower edge is also provided at the rear of the cabinet for access to the mirrors.

The projection head is supported upon a circular way or track 11 fastened to the top of the cabinet 1 and forming the edge of a hole in the top wall. Track 11 provides a circular track for the revolvable turntable 12 of the projection head which supports the drive assembly, the film magazine, projection lens cartridge, light condensing lenses, lamp and housing. Three equispaced bearing posts 13 are provided, within the outer edge of the turntable, which bear on the circular way 11 and act as locators for the projection head, maintaining concentricity in all positions. The projection head is retained on the circular track by three equispaced thumb screws 60.

Turning of the projection head is done manually with the aid of two free-turning spool-type handles, not shown, extending vertically from turntable 12 on opposite sides of the projection head.

The film drive assembly as illustrated in Figures 2 and 3 consists of a variable speed electric motor 17 for driving the two film spool drive spindles 18a and 18b which are journalled in vertical bearings carried by turntable 12. A block 30, supported from turntable 12, supports electric motor 17 by means of a strap 31 which encompasses half of the electric motor and is fastened to the block 30 by means of capscrews 32, one on each side of the electric motor. The drive includes a spring belt 19 connecting pulley 20 on the motor shaft with pulley 21 on the primary shaft 22 which extends back over motor 17 and is journalled in block 30. The primary shaft transmits power to the secondary shaft 23 by means of miter gears 24; the shaft 23 being arranged at right angles to shaft 22 and extending below the ends of spindles 18a and 18b.

The secondary shaft 23 is provided at its two ends with driving wheels 25a and 25b, preferably of the friction type and formed of rubber or other suitable material. Driving wheels 25a and 25b are arranged to engage and drive similar wheels 25c and 25d mounted on the lower ends of spindles 18a and 18b respectively.

To allow for the selective driving of either of the two film spool spindles, secondary shaft 23 is mounted for pivotal movement about a transverse axis at its center, so that when one of the driving wheels on this shaft engages one of the spindle wheels, the other driving wheel is disengaged from the other spindle wheel. To effect this operation, shaft 23 is journaled in bearings carried at the ends of the arms of a U-shaped bracket 26 which is mounted at the center of its yoke portion upon the end of a sleeve 26a, which surrounds the primary shaft 22 and is journaled in the bearing block 30. Thus, the shaft 23 may be tilted about the axis of the shaft 22. A rocker lever 27 is secured to the outer end of sleeve 26a and the two arms of this lever extend in opposite directions beneath a pair of electromagnets 28a and 28b supported on the lower face of turn-table 12, and two magnetic armature pieces 28a' and 28b' are secured to the arms of lever 27.

The rocking lever 27 is held in a horizontal, neutral position when not in operation by means of two springs 33, one on either side, which act against each other in a balanced action. Adjustment of the tension of the springs is made by the attachment screw 34 which fastens one end of each spring to the turn-table.

One suitable arrangement for controlling motor 17 and electromagnets 28a and 28b is illustrated in Figure 2. A portable control box 57 contains two push-buttons 58a and 58b and also a rheostat 59 which is connected to vary the speed of the motor 17. One suitable circuit is shown in Figure 2 where the rheostat is connected in series with motor 17 from terminal a of a supply circuit 60 to a connection 61 leading to one terminal of each of the electromagnets 28a and 28b. Terminal b of the supply circuit is connected to one terminal of each of push-buttons 58a and 58b. The other terminal of magnet 28a is connected to the free terminal of push-button 58a and the remaining terminal of electromagnet 28b is connected to the free terminal of push-button 58b. By pressing button 58a, motor 17 is energized in series with rheostat 59 and magnet 28a, and this magnet rocks shaft 23 in a direction to drive the spindle 18a. In a like manner, pressing button 58b will cause the driving of spindle 18b. Each spindle is driven in a direction such that the attached spool acts as a take-up spool, and each spindle serves as a support for the supply spool while the other spindle is driving the take-up spool. The motor 17 may be energized by one circuit, including the rheostat 59, and the magnets 28a and 28b may be energized through separate circuits controlled by push-buttons 58a and 58b respectively.

A length of electrical cable connects the control box 57 to the reader assembly in such a way that the control box may be placed a reasonable distance from the reader assembly for convenience of the operator.

The film magazine shown in Figures 4 and 5 serves as a permanent container for the film both during projection and during storage of the film. The advantage of this magazine is in the elimination of threading the film through the machine each time it is to be used. Individual take-up and supply spools, and the necessary guide rollers, are mounted within the case of each magazine but are driven from without the case. This magazine need only be removed from its place in a filing rack, placed upon the top of the projection head over the film drive spindles and projection may begin.

The film magazine assembly shown at M in Figure 1 is shown on a larger scale in Figures 4 and 5. It consists of a container having a top half 36 and a bottom half 37 held together by three posts 38a, 38b and 38c mounted within the container. The upper ends of these posts are riveted or otherwise secured to the top half 36, and the bottom ends are secured to the bottom half by screws 39. Posts 38a and 38b serve as shafts for guide rollers 40a and 40b.

The two guide rollers are simple free turning spools which aid in guiding the film as it is drawn from one film spool to the other across the projection window.

The two film spools 41a and 41b are maintained in proper position within the magazine by a pair of guide-pins 42a and 42b secured to the top part 36 of the container and located within the upper half of the central openings of the spools. The upper end of each film spool is provided with an annular recess in which a compression spring 43 is located for normally urging the spool downwardly in contact with the lower half of the container. The lower end of each spool is provided with a recess for receiving a felt washer 44 which is seated on the bottom wall of the container part 37. Thus the spools are normally seated upon the felt washers which serve as brake elements to impose a drag upon each stool.

When the film magazine is placed in operative position upon the reader, the upper tapered ends of drive spindles 18a and 18b extend into the tapered central openings or sockets in the lower ends of spools 41a and 41b respectively. Normally, with the two spindles located at the same level, the spools rest upon the washers 44, but when one of the electromagnets is energized to raise one of the spindles, the raised spindle lifts its associated spool from engagement with the washer 44 and drives the spool in the direction of rotation of the raised spindle. The other spool, which acts as a supply spool, remains seated on its washer 44. By energizing the appropriate electromagnet, the film may be driven in either direction. The tapered portions at the upper ends of spindles 18a and 18b constitute clutch elements which are moved selectively into driving engagement with the sockets in spools 41a and 41b.

It will be noted since the film spools remain in the magazine at all times, they do not require flanges, and this permits close spacing of the spools so that their winding areas overlap, see Figure 4, thus reducing the size of the magazine.

In placing a film within the magazine, the magazine is inverted and, after removing screws 39, the bottom part 37, which is now on top, is removed. The film spools and the guide-rollers remain in proper position in the top half of the container, which now is the bottom half. If spools are already attached to the ends of the film, the spools that are in the container are removed and the spools on the film are slipped over the guide-pins 42a and 42b and passed around the guide-rollers 40a and 40b. The bottom half 37 of the container is now placed in position on top of the half 36 and is secured thereto by replacing the screws 39. The magazine is now ready for use.

The bottom wall of the lower container part 37 is provided with an opening 37a, see Figure 4, near the back wall thereof for receiving one of the optical elements in the projection system, to be described below. The rear wall of the magazine container is provided with an opening 37b, see Figure 5, forming a window for receiving projected rays from the condensing lenses.

The top wall of the container may also have an aperture near the front wall for receiving the upper end of the housing 46a carried on the upper end of the lens tube 46. The film magazine may rest upon a block 12b carried by turntable 12 at the front of the film container, and the lower edge of the front wall of the container may rest upon a ledge formed on casing 46a. The magazine may be held seated on block 12b by a spring clip 12c.

A projection lens tube 46 is supported in a vertical opening at the center of turntable 12 and is provided at its upper end with an enlarged head or housing 46a which is positioned within the opening 37a of the magazine, see Figure 4. This head contains an optical element, such as a mirror or prism, for directing rays from the condensing lenses downwardly along the axis of lens tube 46. In the example shown, a reflecting mirror 48 is arranged at an angle of 45 degrees to the axis of the tube 46 to reflect rays from the condensing lenses along the axis of the tube 46. The housing 46a for mirror 48 is provided with a glass-covered window 47 positioned inside of the opening 37b (Figure 5), and the window 47 is rounded on its outer face to provide a curved guiding surface over which the film F is guided between the guide-rollers 40a and 40b, as shown in Figure 4. Guide rollers 40a and 40b are set back from the face of window 47 so that the tension on the film will hold the film in contact with the outer curved surface of the window.

A suitable projection lamp 52 and condensing lenses 53 are mounted in a protective housing 56 supported on turntable 12 on the opposite side from magazine M. These elements are positioned to direct the rays of light horizontally through the magazine opening 37b, through the film F, and through the projection window 47, onto the mirror 48, and then downwardly through the lens tube 46.

The boundary rays forming the image of the film are shown in Figure 1, where it will be seen that the rays from lens tube 46 are reflected by mirror 2 in an upward and rearward direction against mirror 3, which in turn reflects the image rays forwardly and somewhat upwardly onto the screen 4 to produce a greatly enlarged image with respect to the image carried by the film. It will be understood that the film on window 47 is in one image plane of lens tube 46 and screen 4 is in the other image plane.

The amount of magnification of the image with a given lens tube will depend upon the length of the optical path from lens tube 46 to the screen 4, and this distance is greatly increased over the conventional arrangement by the use of two reflecting mirrors 2 and 3 arranged as shown in Figure 1. The greatest length of optical path is obtained when mirror 2 is as near the bottom wall as possible and mirror 3 is as near the back wall as possible.

By the use of a revolvable projection head, the image projected upon screen 4 may be shifted to accommodate different conditions of operation. For example, if the image appears inverted on the screen, it may be rectified by turning the projection head through 180 degrees, and this may be done without disturbing any of the operative parts. Also, in case the reading material is recorded on the film in transverse lines, which would appear as vertical lines on the screen 4, the lines may be turned to a horizontal position by turning the projection head through 90 degrees.

I claim:

1. A film-projection device comprising a base arranged in a horizontal plane, film-driving means comprising a pair of rotary spindles mounted in vertical bearings and passing through said base, each spindle being movable vertically from a lower position to an upper position, a pair of film-supporting spools supported on said base and having sockets for receiving the upper ends of said spindles, means for driving said spools when said spindles are in the upper position comprising a clutch element on the upper end of each spindle engaging the socket portion of the corresponding spool in the upper position of the spindle and being disengaged therefrom in the lower position of the spindle, means for driving said spindles in opposite directions, and means interconnecting said spindles for selectively raising one of said spindles into its upper spool-driving position and simultaneously lowering the other spindle into non-driving position.

2. A projection apparatus according to claim 1, wherein said base is embodied in a casing, and said driving means and said selective coupling means includes a drive shaft mounted within said casing for rocking movement about a transverse axis at the center thereof, a friction wheel mounted on the lower end of each spindle, a friction wheel mounted on each end of said drive shaft below the friction wheels on said spindles and arranged to selectively engage the friction wheels on said spindles and to raise said spindles when said drive shaft is rocked about its rocking axis, means including a pair of electromagnets suspended from said base for rocking said drive shaft in opposite directions, a control box formed separately from said casing, a pair of push-button switches mounted in said control box, a flexible cable connecting said control box with said casing and including separate circuits controlled by said push-button switches for selectively energizing said electromagnets.

3. A projection apparatus according to claim 2 and including a motor for driving said drive shaft, and a variable resistor mounted within said control box and connected to control the speed of said motor.

4. A projection apparatus according to claim 1 wherein said driving means and said selective coupling means includes a drive shaft mounted for rocking movement about a transverse axis at the center thereof, a friction wheel mounted on the lower end of each spindle, a friction wheel mounted on each end of said drive shaft below the friction wheels on said spindles and arranged to selectively engage the friction wheels on said spindles and to selectively raise said spindles into spool-driving position when said drive shaft is rocked about its rocking axis.

5. A film-projection device comprising a base arranged in horizontal plane, film-driving means comprising a pair of rotary spindles mounted in vertical bearings and passing through said base, each spindle being movable vertically from a lower position to an upper position, a film magazine supported on said base and comprising a casing having openings in the bottom wall thereof for receiving the upper ends of said spindles, a pair of film-supporting spools mounted in said magazine casing and having sockets for receiving the upper ends of said spindles, means for driving said spools when said spindles are in the upper position comprising a clutch element on the upper end of each spindle engaging the socket portion of the corresponding spool in the upper position of the spindle and being disengaged therefrom in the lower position of the spindle, spring means in said casing and normally pressing said spools downwardly in frictional contact with a supporting surface, means on each spindle for lifting the associated spool from contact with its supporting surface upon movement of the spindle into spool-driving position, means for driving said spindles in opposite directions, and means interconnecting said spindles for selectively raising one of said spindles into its upper spool-driving position and simultaneously lowering the other spindle into non-driving position.

References Cited in the file of this patent

UNITED STATES PATENTS

| | | |
|---|---|---|
| 773,985 | Ries | Nov. 1, 1904 |
| 2,159,998 | Morsbach | Mar. 30, 1939 |
| 2,163,593 | Draeger | June 27, 1939 |
| 2,326,654 | Jagust | Aug. 10, 1943 |
| 2,356,421 | Morse | Aug. 22, 1944 |
| 2,377,476 | Berglund | June 5, 1945 |
| 2,401,632 | Greenleaf | June 4, 1946 |
| 2,455,187 | Owens | Nov. 30, 1948 |
| 2,473,736 | Stern | June 21, 1949 |
| 2,487,476 | Pratt | Nov. 8, 1949 |
| 2,558,982 | Pratt | July 3, 1951 |
| 2,564,274 | Pratt | Aug. 14, 1951 |
| 2,564,440 | Maser | Aug. 14, 1951 |
| 2,598,716 | Nygaard | June 3, 1953 |
| 2,624,231 | Kingston | Jan. 6, 1953 |
| 2,664,251 | Berlant | Dec. 29, 1953 |